(12) United States Patent
Olsen

(10) Patent No.: US 7,203,768 B2
(45) Date of Patent: Apr. 10, 2007

(54) MANAGING NETWORK TRAFFIC USING HASHING FUNCTIONS

(75) Inventor: Gregory P. Olsen, Lindon, UT (US)

(73) Assignee: Intel Corporation, Santa Clara, CA (US)

( * ) Notice: Subject to any disclaimer, the term of this patent is extended or adjusted under 35 U.S.C. 154(b) by 525 days.

(21) Appl. No.: 09/746,677

(22) Filed: Dec. 22, 2000

(65) Prior Publication Data

US 2002/0129133 A1    Sep. 12, 2002

(51) Int. Cl.
*G06F 15/16*    (2006.01)

(52) U.S. Cl. ............... 709/249; 709/245; 709/246; 370/400; 370/401

(58) Field of Classification Search ............. 709/217, 709/223, 224, 238, 218, 220, 245–246, 249; 370/253, 254, 238, 256, 310, 402, 400–401, 370/392; 707/10
See application file for complete search history.

(56) References Cited

U.S. PATENT DOCUMENTS

| | | | |
|---|---|---|---|
| 5,684,800 A | | 11/1997 | Dobbins et al. |
| 5,920,701 A | | 7/1999 | Miller et al. |
| 5,978,378 A | * | 11/1999 | Van Seters et al. ......... 370/401 |
| 6,038,608 A | * | 3/2000 | Katsumata ................ 709/238 |
| 6,085,238 A | * | 7/2000 | Yuasa et al. .............. 709/223 |
| 6,088,333 A | * | 7/2000 | Yang et al. ............... 370/238 |
| 6,088,722 A | * | 7/2000 | Herz et al. ............... 709/217 |
| 6,128,665 A | * | 10/2000 | Iturralde ................. 709/238 |
| 6,151,326 A | * | 11/2000 | McGuire et al. ........... 370/402 |
| 6,178,451 B1 | * | 1/2001 | Huitema et al. ........... 709/224 |
| 6,269,404 B1 | * | 7/2001 | Hart et al. ............... 709/238 |
| 6,343,320 B1 | * | 1/2002 | Fairchild et al. .......... 709/224 |
| 6,396,814 B1 | * | 5/2002 | Iwamura et al. ........... 370/256 |
| 6,411,992 B1 | * | 6/2002 | Srinivasan et al. ......... 709/218 |
| 6,442,598 B1 | * | 8/2002 | Wright et al. ............. 709/217 |
| 6,466,552 B1 | * | 10/2002 | Haumont ................. 370/310 |
| 6,480,473 B1 | * | 11/2002 | Chambers et al. .......... 370/253 |
| 6,490,586 B1 | * | 12/2002 | Goft et al. ................ 707/10 |
| 6,532,591 B1 | * | 3/2003 | Arai et al. ............... 725/132 |
| 6,604,138 B1 | * | 8/2003 | Virine et al. ............. 709/224 |
| 6,625,643 B1 | * | 9/2003 | Colby et al. ............. 709/217 |
| 6,674,721 B1 | * | 1/2004 | Dittia et al. ............. 370/235 |
| 7,027,411 B1 | * | 4/2006 | Pulsipher et al. .......... 370/254 |
| 2002/0019236 A1 | * | 2/2002 | Thompson et al. ......... 455/452 |
| 2002/0184387 A1 | * | 12/2002 | Yamaya et al. ............ 709/238 |
| 2003/0037132 A1 | * | 2/2003 | Abdollahi et al. ......... 709/223 |
| 2003/0058804 A1 | * | 3/2003 | Saleh et al. .............. 370/254 |
| 2003/0118034 A1 | * | 6/2003 | Furukawa et al. ......... 370/400 |
| 2004/0264484 A1 | * | 12/2004 | Kui et al. ................ 370/402 |

OTHER PUBLICATIONS

EP 01272454.8—Examination Report Dated Mar. 29, 2006.

* cited by examiner

*Primary Examiner*—ThuHa Nguyen
(74) *Attorney, Agent, or Firm*—Blakely, Sokoloff, Taylor & Zafman LLP

(57) ABSTRACT

Network traffic that is used to communicate multicast and broadcast messages are separated into subgroups with respect to the multicast and broadcast messages. In one embodiment a hashing function is used to separate target devices into subgroups. For example, a device identifier can be used by a hash function to determine which subgroup the device belongs to. Messages can be sent to the different subgroups at different times to manage network traffic, or the devices can reply to messages based on their respective subgroupings to manage network traffic.

15 Claims, 4 Drawing Sheets

MANAGING NETWORK TRAFFIC USING HASHING FUNCTIONS

FIELD OF THE INVENTION

The invention relates to network management. More specifically, the invention relates to scheduling network traffic using hashing functions.

BACKGROUND OF THE INVENTION

In certain situations, network communication is more efficient through use of broadcast or multicast technology. Broadcast data is data that is sent once and received by all members on a given network. For example, all nodes coupled to a network will receive the same broadcast transmission. Multicast data is data that is sent once on a network to a given multicast channel and received by all clients registered to receive data on the given channel. For example, all computer systems coupled to a network can receive the same multicast data if they are listening on the given multicast channel.

However, when broadcasts or multicasts require a response from the recipients, the network can become overwhelmed by the responses. For example, if a multicast to 100 recipients causes the recipients to download a file from a Web server, the Web server my crash as a result of too may requests. If routers or switches within the network are overwhelmed by the responses, the routers and/or switches may drop packets in which case the requested responses never reach the broadcasting/multicasting device.

One solution is to send an exclusion list along with the data that requests a response from the broadcast/multicast recipients. An exclusion list is a list of devices that should not reply to a broadcast or multicast message. However, as the exclusion list becomes large, multiple packets may be required to broadcast/multicast the exclusion list. If a target device does not receive one or more of the packets carrying the exclusion list, the device may respond even though it should have been excluded. Another shortcoming of broadcasting/multicasting the exclusion list in multiple packets is that coordination and management of the exclusion list is complex.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for management of network traffic using hashing functions are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Network traffic that is used to communicate multicast and broadcast messages are separated into subgroups with respect to the multicast and broadcast messages. In one embodiment a hashing function is used to separate target devices into subgroups. For example, a device identifier can be used by a hash function to determine which subgroup the device belongs to. Messages can be sent to the different subgroups at different times to manage network traffic, or the devices can reply to messages based on their respective subgroupings to manage network traffic.

Figure 1:
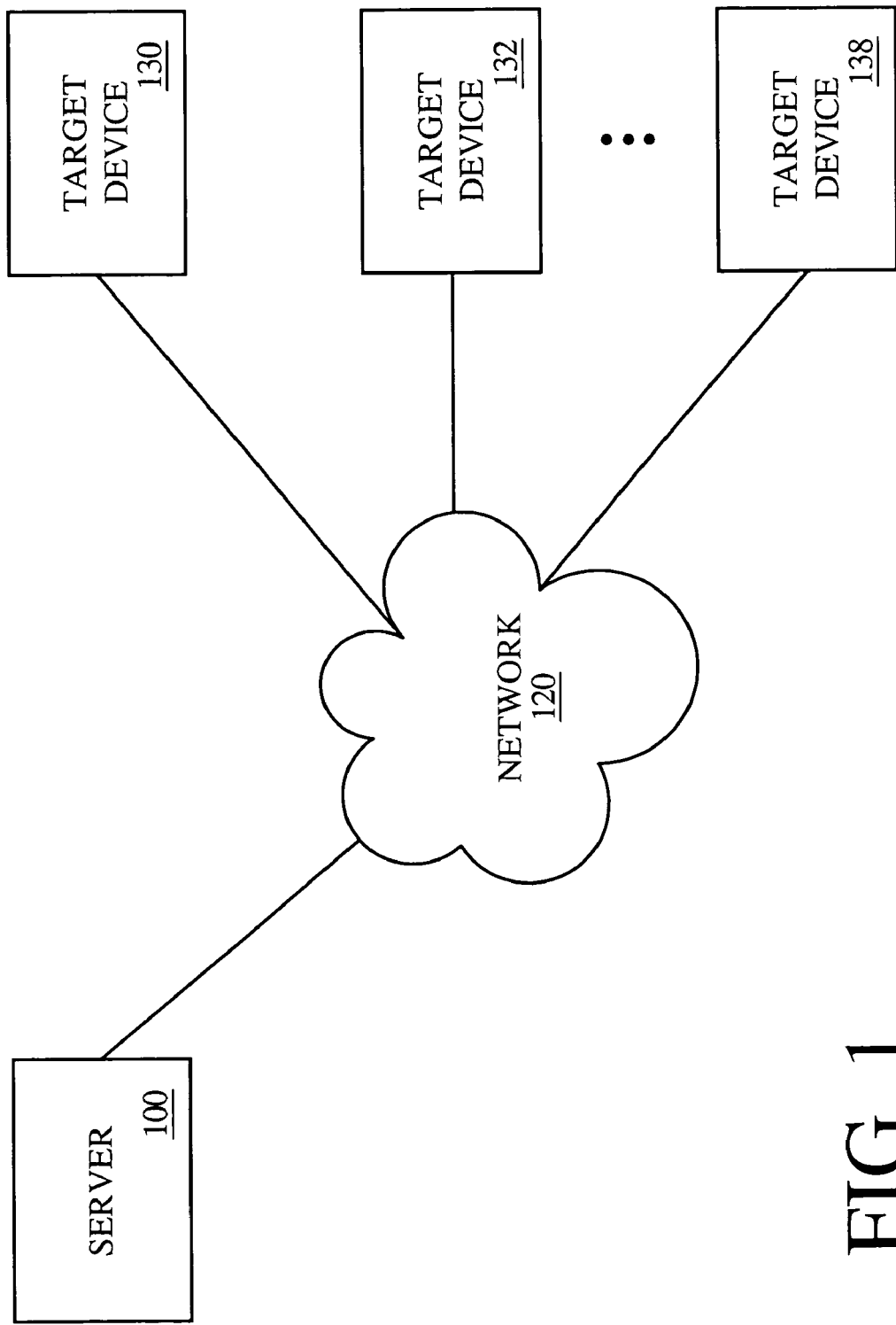
FIG. 1 is one embodiment of a network configuration with one electronic device broadcasting messages to multiple electronic devices also coupled to the network.

FIG. 1 is one embodiment of a network configuration with one electronic device broadcasting messages to multiple electronic devices also coupled to the network. The network configuration of FIG. 1 is described in terms of a server multicasting or broadcasting messages to multiple target devices. Any type of communications between one networked device and multiple target devices can be managed in a similar manner. The sending and/or target devices can be any type of networked electronic device. Also, devices that are target devices in some situations may be sending devices in other situations.

Server 100 sends messages to multiple target devices (e.g., 130, 132, 138) via network 120. The messages can be communicated, for example, using multicast or broadcast protocols. Any type of protocol that is capable of communicating messages to multiple target devices can be used. Network 120 can be any type of network, for example, a local area network or a wide area network such as the Internet.

Network protocols such as Internet Protocol (IP) make it possible to send broadcast or multicast traffic to numerous target devices. However, current network protocols do not provide a mechanism for controlling the number of target devices that respond to the message or the manner in which the target devices respond to the message. In large-scale networks, it is possible for thousands of computers to send response packets in response to a broadcast discovery request packet.

When too many response packets are generated in a short period of time the network can become overloaded and congested. When the network is congested, routers and switches within the network may drop packets resulting in lost data. If the lost data is critical data, devices may not function properly or multiple requests may be required to gather the desired data.

By using hashing functions, such as those described in greater detail below, to determine which target devices should respond or when the target devices should respond, congestion can be controlled and/or reduced. Because the responses from the target devices can be staggered, or otherwise controlled, network traffic can be controlled. By preventing or reducing network congestion, it is possible to prevent or reduce the dropping of packets by routers and/or switches. This provides a more robust protocol and more reliable receipt of response packets.

Current exclusion list technology often results in exclusion lists that cannot fit in the same packet as a request. One approach is to provide exclusion packets that are transmitted separately from the associated request packet. If a target device misses any one of the series of exclusion packets, that target device cannot determine whether it is included in the exclusion list and therefore must operate as if it were not included in the exclusion list. Another shortcoming of exclusion packets is that multiple request packets having associated exclusion lists may be concurrently pending, in which case the exclusion list may become confused. Use of hashing functions for network traffic management as described herein allows request packets to include exclusion lists thereby avoiding the shortcomings of separate exclusion packets. The exclusion list can always be made to fit in a single packet by increasing the number of sub groups used in the hashing function. This is because only machines in the sub group are included in the exclusion list in the packet intended for that group.

The following is an example of a hashing function that can be used to control how many client devices respond to a message. A server device broadcasts or multicasts a request packet to 100 target devices via a network. The target devices have unique identifiers 0 through 99. Each target device can use the following modulo hashing function on its unique identifier.

```
int ModuloHashFunction (int bins, int uniqueID)
{
return(uniqueId % bins);
}
```

The hashing function has two input values: the number of bins and some unique data associated with the target device. The number of bins is the number of subgroups to which a message is to be communicated. The output is the hash value in the range of the number of bins. For example, if the number of bins is 5, then the hashing function will return a hash value between 0 and 4 inclusive. The hashing function generally returns an evenly distributed number of hash values from the unique data passed in. Continuing the example, if 100 target devices use the same hashing function (using 5 for the number of bins) approximately 20 target devices map to each of the bins. While the hashing function is described as a modulo function; other types of hashing functions can also be used.

In one embodiment communications between the sending device and the target device includes the number of bins and the specific hash value (or bin index). The target devices having hash values that match the value in the request respond to the request. Other target devices do not respond to the request. This allows applications that send the same request to many target devices to benefit from broadcast and/or multicast technology while controlling the number of target devices that respond to a request. From the example above, the application will send five requests (one for each bin) using broadcast or multicast technology. Only the target devices in the specified subgroup respond to the request packets.

The following table illustrates the packet exchange between the sending device and the target devices.

| Server Requests | Responding Clients |
| --- | --- |
| Bins = 5, hash = 0 | 0, 5, 10, 15, . . . , 95 |
| Bins = 5, hash = 1 | 1, 6, 11, 16, . . . , 96 |
| Bins = 5, hash = 2 | 2, 7, 12, 17, . . . , 97 |

-continued

| Server Requests | Responding Clients |
| --- | --- |
| Bins = 5, hash = 3 | 3, 8, 13, 18, . . . , 98 |
| Bins = 5, hash = 4 | 4, 9, 14, 19, . . . , 99 |

Without using the hashing function, the sending device could receive up to 100 responses simultaneously or within a short time period. Using the hashing function allows the sending device to receive 20 or fewer responses simultaneously or within a short time period. The number of bins used can be selected based on factors such as, for example, maximum packet size (so full exclusion list for subgroup can fit), network bandwidth considerations, sending device processing power, or other factors.

While managing of network traffic using hashing functions has been described in terms of dividing target devices into subgroups, these subgroups can be used in many different ways. Limiting the number of replies to a broadcast or multicast request has been described above. A broadcast message can cause different target device subgroups to use a certain multicast channel or broadcast port to receive additional packets. A broadcast message can cause target devices in different subgroups to download a particular file at different times to prevent the server providing the download from being bombarded with requests for data. Other uses can also be provided.

Figure 2:
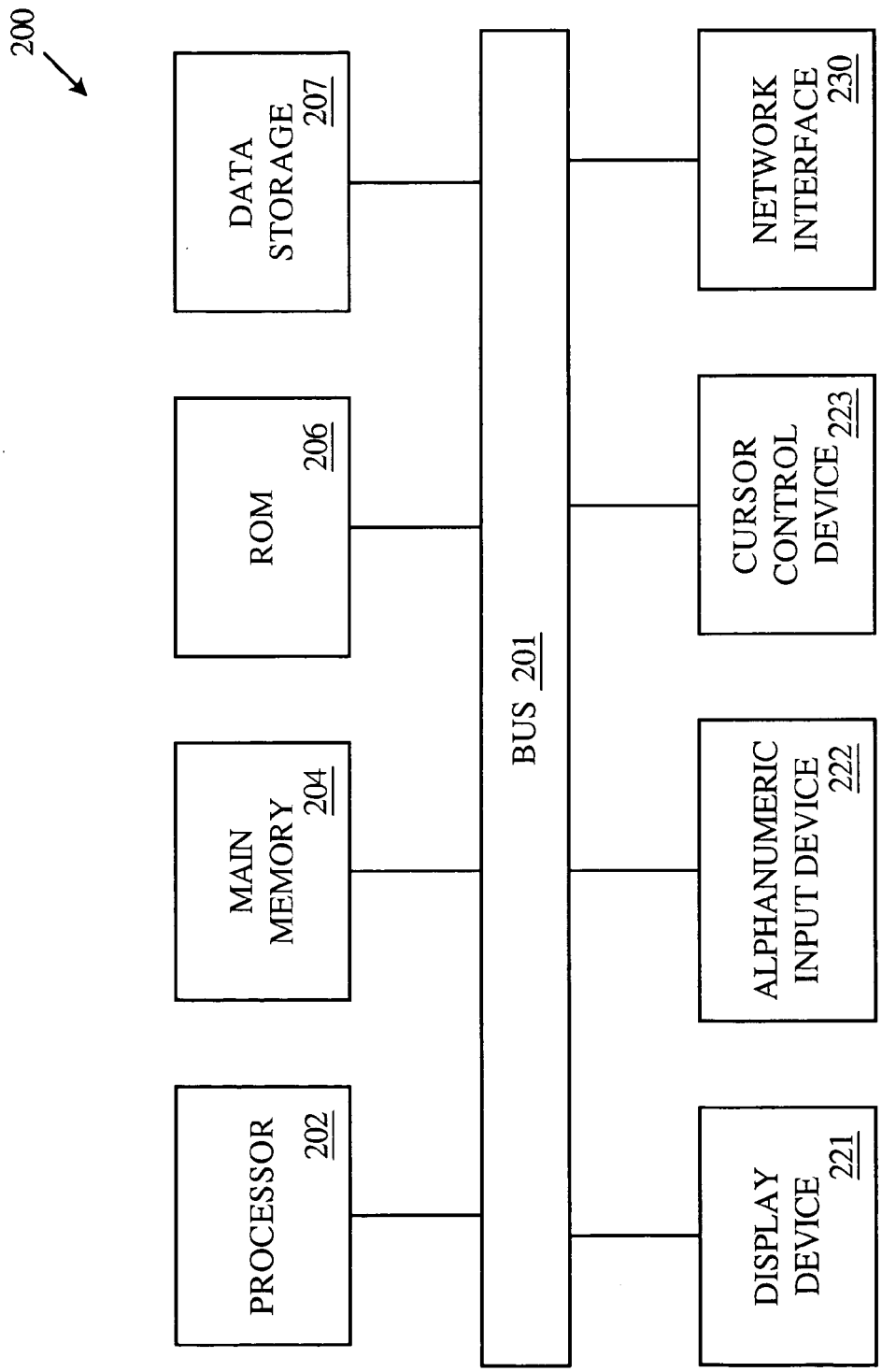
FIG. 2 is one embodiment of an electronic system having a network portal interface.

FIG. 2 is one embodiment of an electronic system having a network portal interface. The electronic system illustrated in FIG. 2 is intended to represent a range of electronic systems such as, for example, computer systems, set top boxes, or personal digital assistants (PDAs). Alternative electronic systems can include more, fewer and/or different components.

Electronic system 200 includes bus 201 or other communication device to communicate information, and processor 202 coupled to bus 201 to process information. While electronic system 200 is illustrated with a single processor, electronic system 200 can include multiple processors and/or co-processors. Electronic system 200 further includes random access memory (RAM) or other dynamic storage device 204 (referred to as main memory), coupled to bus 201 to store information and instructions to be executed by processor 202. Main memory 204 also can be used to store temporary variables or other intermediate information during execution of instructions by processor 202.

Electronic system 200 also includes read only memory (ROM) and/or other static storage device 206 coupled to bus 201 to store static information and instructions for processor 202. Data storage device 207 is coupled to bus 201 to store information and instructions. Data storage device 207 such as a magnetic disk or optical disc and corresponding drive can be coupled to electronic system 200.

Electronic system 200 can also be coupled via bus 201 to display device 221, such as a cathode ray tube (CRT) or liquid crystal display (LCD), to display information to a computer user. Alphanumeric input device 222, including alphanumeric and other keys, is typically coupled to bus 201 to communicate information and command selections to processor 202. Another type of user input device is cursor control 223, such as a mouse, a trackball, or cursor direction keys to communicate direction information and command selections to processor 202 and to control cursor movement on display 221.

Electronic system 200 further includes network interface 230 to provide access to a network, such as a local area network. Network access can be provided in any manner known in the art. In one embodiment, network portal interface 240 is coupled to bus 201. In one embodiment, the first slot of the primary Peripheral Component Interconnect (PCI) bus is preferred. However, any slot of any bus can be used with the appropriate interfaces.

Instructions are provided to memory from a storage device, such as magnetic disk, a read-only memory (ROM) integrated circuit, CD-ROM, DVD, via a remote connection (e.g., over a network via network interface 230) that is either wired or wireless, etc. In alternative embodiments, hardwired circuitry can be used in place of or in combination with software instructions to implement the present invention. Thus, the present invention is not limited to any specific combination of hardware circuitry and software instructions.

A machine-accessible medium includes any mechanism that provides (i.e., stores and/or transmits) information in a form readable by a machine (e.g., a computer). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals), etc.

Figure 3:
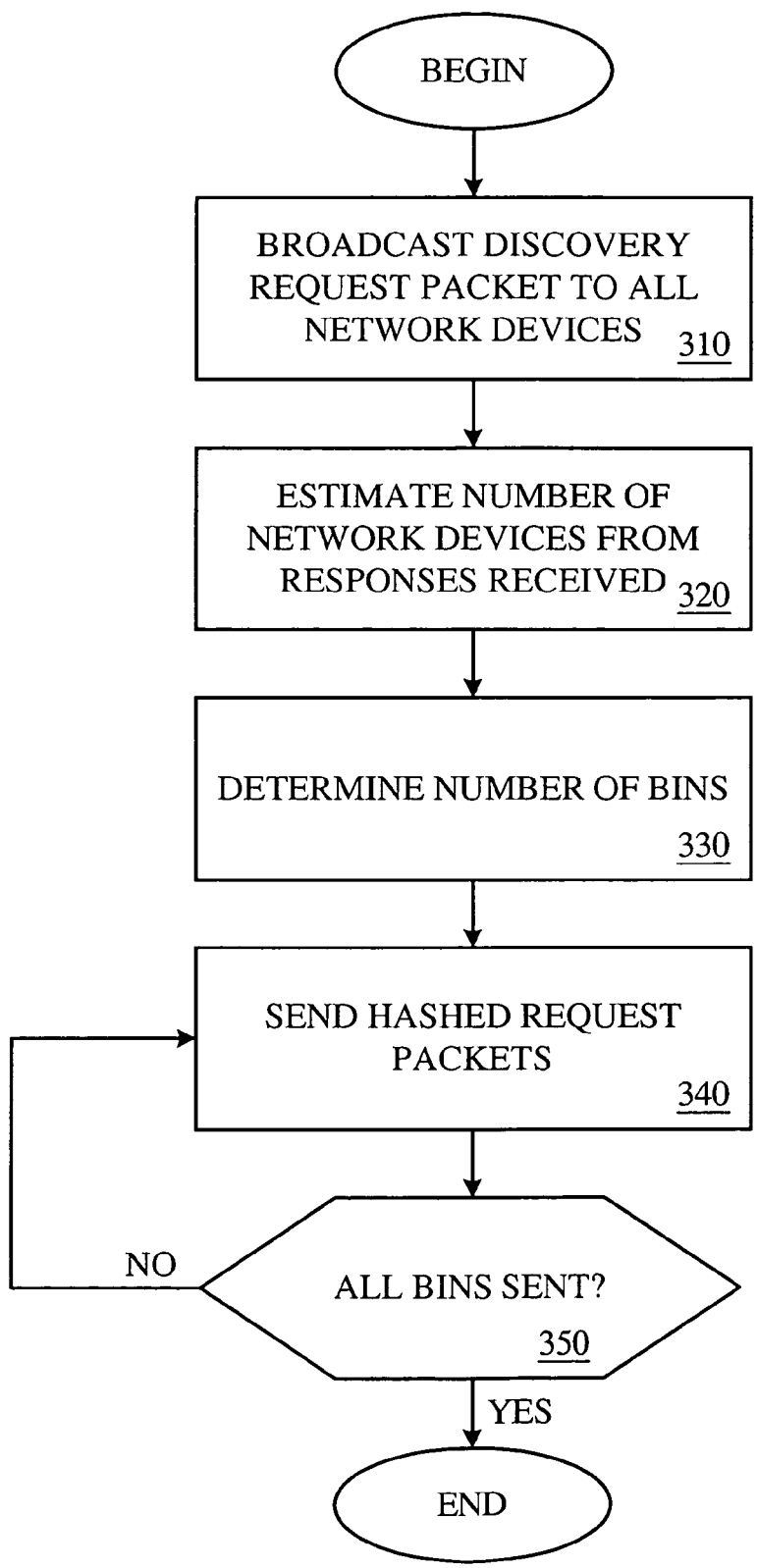
FIG. 3 is a flow diagram of a sending device communicating using hashing functions to manage network traffic.

FIG. 3 is a flow diagram of a sending device communicating using hashing functions to manage network traffic. The example of FIG. 3 is a discovery sequence; however, the techniques described with respect to FIG. 3 can be used for other purposes. In the example of FIG. 3, an initial discovery request packet is broadcast to all network devices requesting a response. In alternate embodiments, the initial discovery request packets are hashed and sent to subsets of all networked devices.

A discovery request packet is broadcast to all network devices at 310. In one embodiment, the discovery request packet requests information (e.g., hardware configurations, software configurations) from all network devices for remote management or other purposes.

All network devices that receive the initial discovery request respond, or attempt to respond, to the initial discovery request. Because of bandwidth considerations, processing limitations or other conditions, one or more of the responses may not be received by the device that sent the initial discovery request.

In one embodiment, the total number of network devices is estimated, at 320, from the number and/or type of responses to the initial discovery request. For example, the number of responses received can be considered a predetermined percentage of all network devices, or the range of addresses or identifiers can provide information as to the number of devices coupled to the network.

A number of bins is determined, at 330, based on the number of simultaneous, or nearly simultaneous, responses that are desired. For example, if the device that sent the initial discovery request can process 10 simultaneous messages, the estimated number of network devices can be divided by 10 to determine a number of bins to be used. An additional safety factor can also be included in the computation.

The hashed request packets are sent at 340. As described above, one request message is sent for each bin at 350. There may be a delay between messages that are sent for each bin. The request messages include the hash value and the corresponding bin value. The bin value is the number of bins and the hash value is the bin to which the machine belongs.

The network devices receive the requests and determine the appropriate request message for which a response should be generated by ignoring the messages that do not match their hash value.

Figure 4:
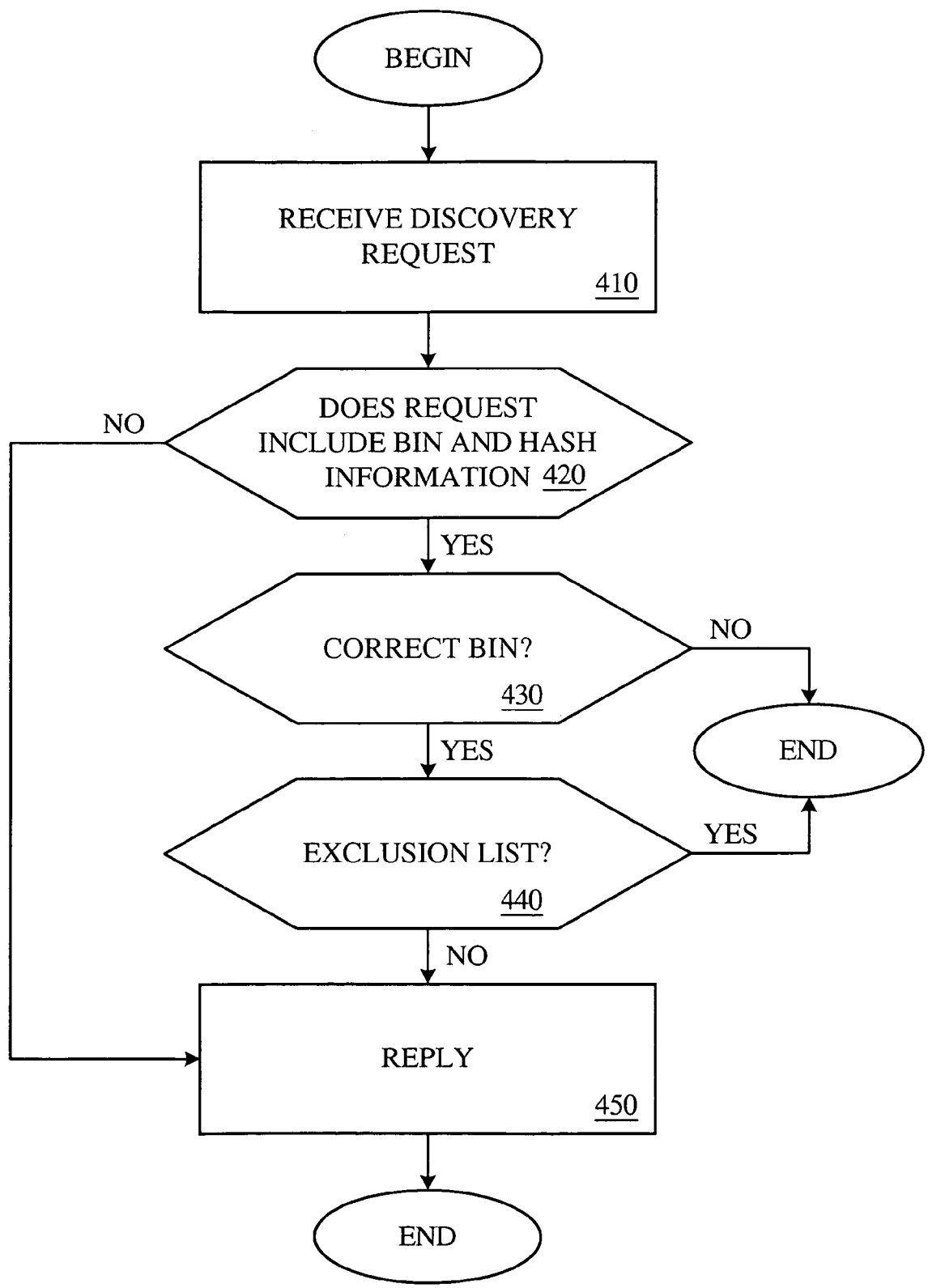
FIG. 4 is a flow diagram of a target device communicating using hashing functions to manage network traffic.

FIG. 4 is a flow diagram of a target device communicating using hashing functions to manage network traffic. As with FIG. 3, the example of FIG. 4 is a discovery sequence; however, the techniques described with respect to FIG. 4 can be used for other purposes.

A target device receives a discovery request at 410. The target device determines whether the discovery request includes a bins value and a hash value at 420. If the discovery request does not include a bins value and a hash value, the target device generates a reply to the discovery request at 450.

If the target device determines that the discovery request includes a bins value and a hash value, the target device determines, using the hashing function, whether its hash value matches the hash value of the request that has been received at 430. If not, the target device does not reply to the discovery request. If the target device determines that its hash value matches the hash value of the discovery request at 430, the target device determines whether it is included in the exclusion list of the discovery request at 440.

If the target device is included in the exclusion list at 440, the target device does not reply to the discovery request. If the target device is not included in the exclusion list, a reply is generated at 450.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
    broadcasting a discovery request to network devices;
    estimating a number of network devices from responses received from the network devices;
    dividing target devices into subsets of target devices, wherein a subset to which a particular device belongs is determined based on a subset index value corresponding to results of a hash function performed with an identifier of the device and a number of subsets to which the target devices are divided;
    sending a second request;
    limiting subsets of target devices responsive to the second request, in part based on the second request including the number of subsets to which the target devices are divided and the subset index value, wherein the subset index value indicates a specific subset of the number of subsets to which the second message is targeted; and
    varying a timing with which the second request is communicated to the subsets of target devices to result in the second request being sent to the multiple subsets at varying times.

2. The method of claim 1 wherein determining the subset of target devices comprises:
    broadcasting over a network;
    receiving one or more responses to the network broadcast from target devices coupled to the network;
    estimating a number of devices coupled to the network; and
    determining a number of subgroups based, at least in part, on the estimated number of devices coupled to the network.

3. The method of claim 1 wherein determining the subset of target devices comprises:
 multicasting to a subset of a network;
 receiving one or more responses from target devices of the subnet;
 estimating a number of devices in the subnet; and
 determining a number of subgroups based, at least in part, on the estimated number of devices in the subnet.

4. A physical article comprising a tangible machine-accessible medium to provide machine-readable instructions that, when executed, cause one or more electronic system to:
 broadcast a discovery request to network devices;
 estimate a number of network devices from responses received from the network devices;
 divide target devices into subsets of target devices, wherein a subset to which a particular device belongs is determined based on a subset index value corresponding to results of a hash function performed with an identifier of the device and a number of subsets to which the target devices are divided;
 send a second request;
 limit subsets of target devices responsive to the second request, in part based on the second request including the number of subsets to which the target devices are divided and the subset index value, wherein the subset index value indicates a specific subset of the number of subsets to which the second message is targeted; and
 vary a timing with which the second request is communicated to the subsets of target devices to result in the second request being sent to the multiple subsets at varying times.

5. The physical article of claim 4 wherein the instructions that cause the one or more electronic systems to determine the subset of target devices further comprises sequences of instructions that, when executed, cause the one or more electronic systems to:
 broadcast over a network;
 receive one or more responses from target devices coupled to the network;
 estimate a number of devices coupled to the network; and
 determine a number of subgroups based, at least in part, on the estimated number of devices coupled to the network.

6. The physical article of claim 4 wherein the instructions that cause the one or more electronic systems to determine the subset of target devices further comprises sequences of instructions that, when executed, cause the one or more electronic systems to:
 multicast to a subset of a network;
 receive one or more responses from target devices of the subnet;
 estimate a number of devices in the subnet; and
 determine a number of subgroups based, at least in part, on the estimated number of devices in the subnet.

7. A method comprising:
 broadcasting a discovery request to network devices;
 estimating a number of network devices from responses received from the network devices;
 dividing a set of target devices into multiple subsets of target devices, wherein the subset to which a particular device belongs is determined based on an identifier of the device;
 sending a second request;
 limiting subsets of target devices responsive to the second request, in part based on the second request including the number of subsets to which the target devices are divided and a subset index value, wherein the subset index value indicates a specific subset of the number of subsets to which the second message is targeted;
 performing a hash function with a unique identifier and the number of subsets to generate a hash result; and
 responding to the second message if the hash result equals the hash the subset index value.

8. The method of claim 7 wherein determining the subset of target devices comprises:
 broadcasting over a network;
 receiving one or more responses from target devices coupled to the network;
 estimating a number of devices coupled to the network; and
 determining a number of subgroups based, at least in part, on the estimated number of devices coupled to the network.

9. The method of claim 7 wherein determining the subset of target devices comprises:
 multicasting to a subset of a network;
 receiving one or more responses from target devices of the subnet;
 estimating a number of devices in the subnet; and
 determining a number of subgroups based, at least in part, on the estimated number of devices in the subnet.

10. A physical article comprising a tangible machine-accessible medium to provide machine-readable instructions that, when executed, cause one or more electronic system to:
 broadcast a discovery request to network devices;
 estimate a number of network devices from responses received from the network devices;
 divide a set of target devices into multiple subsets of target devices, wherein the subset to which a particular device belongs is determined based on an identifier of the device;
 send a second request;
 limit subsets of target devices responsive to the second request, in part based on the second request including the number of subsets to which the target devices are divided and a subset index value, wherein the subset index value indicates a specific subset of the number of subsets to which the second message is targeted;
 perform a hash function with a unique identifier and the number of subsets to generate a hash result; and
 respond to the second message if the hash result equals the hash the subset index value.

11. The physical article of claim 10 wherein the instructions that cause the one or more electronic systems to determine the subset of target devices further comprises sequences of instructions that, when executed, cause the one or more electronic systems to:
 broadcast over a network;
 receive one or more responses from target devices coupled to the network;
 estimate a number of devices coupled to the network; and
 determine a number of subgroups based, at least in part, on the estimated number of devices coupled to the network.

12. The physical article of claim 10 wherein the instructions that cause the one or more electronic systems to determine the subset of target devices further comprises sequences of instructions that, when executed, cause the one or more electronic systems to:
 multicast to a subset of a network;
 receive one or more responses from target devices of the subnet;
 estimate a number of devices in the subnet; and determine a number of subgroups based, at least in part, on the estimated number of devices in the subnet.

13. A tangible machine-accessible medium having electronic data signals stored therein, the medium to be shared among a plurality of network devices, wherein the electronic data signals comprise sequences of instructions that, when executed, cause one or more electronic systems to:
broadcast a discovery request to network devices;
estimate a number of network devices from responses received from the network devices;
divide a set of target devices into multiple subsets of target devices, wherein the subset to which a particular device belongs is determined based on an identifier of the device;
send a second request;
limit subsets of target devices responsive to the second request, in part based on the second request including the number of subsets to which the target devices are divided and a subset index value, wherein the subset index value indicates a specific subset of the number of subsets to which the second message is targeted;
perform a hash function with a unique identifier and the number of subsets to generate a hash result; and
respond to the second message if the hash result equals the hash the subset index value.

14. The tangible machine-accessible medium of claim 13 wherein the sequences of instructions that cause the one or more electronic systems to determine the subset of target devices further comprises sequences of instructions that, when executed, cause the one or more electronic systems to:
broadcast over a network;
receive one or more responses from target devices coupled to the network;
estimate a number of devices coupled to the network; and
determine a number of subgroups based, at least in part, on the estimated number of devices coupled to the network.

15. The tangible machine-accessible medium of claim 13 wherein the sequences of instructions that cause the one or more electronic systems to determine the subset of target devices further comprises sequences of instructions that, when executed, cause the one or more electronic systems to:
multicast to a subset of a network;
receive one or more responses to from target devices of the subnet;
estimate a number of devices in the subnet; and
determine a number of subgroups based, at least in part, on the estimated number of devices in the subnet.

* * * * *